(12) United States Patent
Kaushik et al.

(10) Patent No.: US 9,317,706 B2
(45) Date of Patent: Apr. 19, 2016

(54) MULTI-TENANT SYSTEM

(75) Inventors: Sundarraj Kaushik, Mumbai (IN);
Hiro Gangwani, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 717 days.

(21) Appl. No.: 13/247,927

(22) Filed: Sep. 28, 2011

(65) Prior Publication Data

US 2012/0166488 A1    Jun. 28, 2012

(30) Foreign Application Priority Data

Dec. 22, 2010 (IN) .......................... 3508/MUM/2010

(51) Int. Cl.
*G06F 17/30* (2006.01)
*G06F 21/62* (2013.01)

(52) U.S. Cl.
CPC ...... *G06F 21/6209* (2013.01); *G06F 17/30864* (2013.01)

(58) Field of Classification Search
CPC .................. G06F 17/30864; G06F 17/30867
USPC ......................................... 707/705
See application file for complete search history.

(56) References Cited

U.S. PATENT DOCUMENTS 6,823,384 B1 * 11/2004 Wilson et al. ................. 709/225
2008/0162491 A1 * 7/2008 Becker et al. ................... 707/10

OTHER PUBLICATIONS

Guo et al. ("A Framework for Native Multi-Tenancy Application Development and Management", The 9th IEEE International Conference E-Commerce, Jul. 2007).*

* cited by examiner

*Primary Examiner* — Belix M Ortiz Ditren
(74) *Attorney, Agent, or Firm* — Lee & Hayes, PLLC (57) ABSTRACT

Method(s) and system(s) for identifying an application behavior of a multi-tenant application for a tenant are described herein. The method includes determining whether a reference attribute of the multi-tenant application is encountered by the tenant. The reference attribute is an application attribute for which variations from a default behavior of the multi-tenant application are available. Based on the determining, it is ascertained whether a configuration template is defined for the tenant. Further, based on the ascertainment of the configuration template, the application behavior corresponding to the tenant is identified. The identified application behavior is provided to the multi-tenant application such that multi-tenant application exhibits the identified application behavior.

20 Claims, 5 Drawing Sheets

| Application Attribute Master Metadata 256 ||
|---|---|
| Application Attribute ID | Application Attribute value |
| AA1-01 | <Default value 01 for Attribute 01> |
| AA1-02 | <Variation value 02 for Attribute 01> |
| AA1-09 | <Variation value 03 for Attribute 01> |
| AA2-01 | <Default value 01 for Attribute 02> |
| AA2-02 | <Variation value 02 for Attribute 02> |
| AA2-09 | <Variation value 03 for Attribute 02> |
| AA3-01 | <Default value 01 for Attribute 03> |
| AA3-02 | <Variation value 02 for Attribute 03> |
| AA3-03 | <Variation value 03 for Attribute 03> |
| AA3-04 | <Variation value 04 for Attribute 03> |

| Tenant-Attribute Association Metadata 250 |||
|---|---|---|
| Tenant ID | Reference Attribute ID | Differential Attribute ID |
| TN09 | AA1-01 | AA1-09 |
| TN09 | AA2-01 | AA2-09 |

| Tenant-Template Association Metadata 252 ||
|---|---|
| Tenant ID | Configuration Template ID |
| TN01 | CT01 |
| TN02 | CT01 |
| TN03 | CT01 |
| TN04 | CT02 |
| TN05 | CT03 |
| TN06 | CT04 |

Fig. 2b

Template-Attribute Association Metadata 262

| Configuration Template ID | Reference Attribute ID | Value of differential Attribute |
|---|---|---|
| CT01 | AA1-01 | <Default value 01 for Attribute 01> |
| CT01 | AA2-01 | <Default value 01 for Attribute 2> |
| CT02 | AA1-01 | <Variation value 02 for Attribute 01> |
| CT03 | AA2-01 | <Variation value 02 for Attribute 02> |

Attribute-Locale-Template Association Metadata 260

| Template ID | Reference Attribute ID | Locale ID | Differential Attribute ID |
|---|---|---|---|
| CT01 | AA3-01 | LC01 | NULL |
| CT01 | AA3-01 | LC02 | AA3-02 |
| CT01 | AA3-01 | LC03 | AA3-03 |

Attribute-Template Association Metadata 254

| Template ID | Reference Attribute ID | Differential Attribute ID |
|---|---|---|
| CT01 | AA1-01 | NULL |
| CT02 | AA1-01 | AA1-02 |
| CT01 | AA2-01 | NULL |
| CT03 | AA2-01 | AA2-02 |

Template Inheritance Metadata 258

| Template ID | Parent Template ID | IsBaseTemplate |
|---|---|---|
| CT01 | Null | Yes |
| CT02 | CT01 | No |
| CT03 | CT01 | No |
| CT04 | CT02 | No |
| CT04 | CT03 | No |

MULTI-TENANT SYSTEM

TECHNICAL FIELD

The present subject matter relates, in general, to computing systems and, in particular, to multi-tenant systems.

BACKGROUND

Generally, a multi-tenant system offered by an information technology (IT) service provider hosts applications, also called as multi-tenant applications. In such a system, a single instance of the application runs on a server, which is accessed by multiple clients, also referred to as tenants since such clients subscribe to a service offered by the IT service provider. In the multi-tenant system, the tenants share the same applications and the same platform and infrastructure components for processing and storing data. Thus, the multi-tenant system provides the tenants with network-based access to centralized data and incurs less cost than is incurred when using individually-provisioned software applications.

A growing number of organizations such as, information technology (IT) service providers offer multi-tenant applications to minimize cost and maximize efficiency. Further, these organizations may have to cater to different tenant requirements and may require the applications to behave based on their preferences. In order to cater to the preferences of the tenants, the multi-tenant system may be configured such that the applications provisioned and their behavior varies based on the tenant accessing the applications. The application behavioral aspects include its user interface, its processing steps, business rules, workflow, access controls, application data structures, reports, integrations with other applications, and such other application attributes. For example, the same application may generate a report that has one layout for a tenant and a different layout for another.

However, with the increase in the number of tenants, there is a corresponding increase in the variations or configurations required in a multi-tenant application hosted on the multi-tenant system. Further, supporting more variations entails maintaining additional tenant-specific metadata, which may adversely impact application performance, the administrative effort to maintain metadata, as well as the storage consumed. Therefore, conventional multi-tenant systems support limited configurability when implemented for an increased number of tenants that have varying application behavioral requirements.

SUMMARY

This summary is provided to introduce concepts related to multi-tenant systems and applications, which are further described below in the detailed description. This summary is not intended to identify essential features of the claimed subject matter nor is it intended for use in determining or limiting the scope of the claimed subject matter.

Method(s) and a system(s) for multi-tenancy are described herein. In one implementation, it is determined if a reference attribute of a multi-tenant application is encountered. The reference attribute is an application attribute for which there can be variations in behavior of the multi-tenant application for various tenants. Based on the determining, it is ascertained whether a configuration template is defined for the tenant. Further, the configuration template can be associated with a single tenant or a group of tenants preferring similar application behavior.

In one implementation, if it is ascertained that the configuration template is not defined for the tenant, an application behavior, of the multi-tenant application, for the tenant is identified based on the reference attribute. However, if it is determined that the configuration template is defined for the tenant, the application behavior is identified based at least, in part, on the configuration template and the reference attribute. The identified application behavior can be a default behavior or a variation from the default behavior.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

The subject matter described herein relates to multi-tenant systems that facilitate configuration of multi-tenant applications and provides an application behavior based on preferences of tenants accessing the multi-tenant application. The system(s) and method(s) described herein can be implemented on a variety of devices, such as a server, a desktop computer, a notebook or a portable computer, a mainframe computer, a mobile computing device, and the like.

In today's competitive business environment, organizations, such as, information technology (IT) service providers are prompted to achieve high quality and cost efficiency in the IT infrastructure provisioned for their clients. In order to achieve the same, many such organizations implement multi-tenant systems. In a multi-tenant system, a single instance of an application is provisioned for multiple clients and therefore, the multi-tenant systems require a smaller infrastructure, in contrast to having a dedicated installation for each client. Accordingly, the multi-tenant systems considerably reduce costs, management overhead, and complexity.

Generally, an application hosted on a multi-tenant system, and referred to as a multi-tenant application, may not be configurable for multiple client environments. In order to cater to preferences of various clients, i.e., tenants, a multi-tenant system may facilitate provisioning of multi-tenant applications and configuration of the application behavior. The multi-tenant system may include configuration of various types of application behaviors. Typically, metadata that governs the application behavior for identified application attributes needs to be maintained for every tenant of a multi-tenant application. With the increase in the number of tenants, there is a corresponding increase in the variations required. Accordingly, with an increase in the number of clients such multi-tenant systems may have limited implementation.

In one such conventional multi-tenant system, in order to configure a multi-tenant application, multiple instances of application behavior metadata pertaining to the individual preferences of each tenant are created. This may not only be a storage inefficient solution but may also pose difficulties in managing large number of tenants. For example, consider that a multi-tenant application is accessed by 1000 tenants, where the metadata for each tenant may have 10 entries of 1 kilobyte (KB) each. In such a multi-tenant environment, 10000 KB of storage space may be consumed for storing the metadata pertaining to the tenants accessing the multi-tenant system. Thus, with an increase in the number of the tenants, there is a linear growth in application behavior metadata. Further, a change in application behavior metadata that is common for a plurality of tenants will need to be made in all the replicated copies rather than in one single location from which such a plurality of tenants benefit. Such a multi-tenant system may have restricted application due to management overhead, scalability, and storage inefficiency.

Further, in certain other conventional multi-tenant systems, when a new variation of an existing application attribute is added, the existing multi-tenant application is recompiled and redeployed, which in turn may lead to longer turn-around time and longer service down-time.

The present subject matter describes method(s) and system(s) for configurations in the multi-tenant applications and for providing various application behaviors for the multi-tenant application based on the preferences of tenants. A multi-tenant application is accessed by a plurality of tenants. In one implementation, the multi-tenant application is designed and developed to include a plurality of application attributes associated with it. The application behavior of the multi-tenant application can be defined by its application attributes. The application attributes may have variations for various tenants. The application attributes include, but are not limited to, a multi-tenant application's user interface, its processing steps, its business rules, its workflow, its access controls, its application data structures, its reports, and its integrations with other applications. For example, processing steps of a billing application may vary for tenants in different industry verticals, with the basic functionality of the billing application remaining same. Thus, processing steps may be considered as one of the application attributes of the multi-tenant application. In another example, one or more tenants may prefer to have additional fields in the billing application in addition to the default ones. In said example, the availability of extensions to the application data structure to accommodate additional fields can be considered as an application attribute.

Further, for each multi-tenant application its default behavior may be identified. The default behavior represents the most typical application behavior that tenants are likely to choose. The default behavior includes all the application attributes of the multi-tenant application. In one implementation, the multi-tenant application has a base template associated with it. The base template governs the default behavior of the multi-tenant application and holds metadata pertaining to the default behavior of the multi-tenant application. The base template so formed has default values for all the application attributes.

In one implementation, all variations of the same application attribute are referred to by a common code; the reference attribute. The application source code refers to all variations of the attribute by this reference attribute. However, to accommodate variations desired by various tenants, the reference attribute maps to one or more differential attributes or, to say, one or more application behaviors. The mapping of a reference attribute to multiple differential attributes is maintained outside the multi-tenant application. Each differential attribute indicates a behavior of the multi-tenant application with respect to the reference attribute. Further, the differential attribute can indicate a variation in the default behavior with respect to that reference attribute. For example, if an application attribute has ten variants; ten distinct differential attributes corresponding to the respective variants can be associated with the reference attribute. Additionally, the differential attribute may also indicate that the default behavior is to be followed. Thus, owing to the provision of the reference attributes and the differential attributes, the existing multi-tenant application with its variations may neither be recompiled nor be redeployed in situations, such as, addition of new variations of an existing application attribute. Such a new variation of an application attribute may be independently added in the multi-tenant system for use.

Although variations in an application behavior are required, not all variations may be unique to a tenant. In one implementation, these variations are specific to a group of tenants. The groups of tenants can be formed based on a combination of factors, for example, country or region of operation, industry verticals, and business size. All tenants in a group can see identical application behaviors. In one implementation, the multi-tenant application may have one or more configuration templates associated with it, in addition to a base template. A configuration template may contain one or more differential attributes, which specifies variation requested by a tenant. In one implementation, where a variation from the default behavior of the multi-tenant application is common to a group of tenants from among the plurality of the tenants, a configuration template may also be associated with the group of tenants. This configuration template may in turn contain differential attributes common to the tenant group.

Additionally or alternately, a configuration template may be inherited from one or more other configuration templates, which can be referred to as parent configuration templates. For example, a configuration template may be inherited from another configuration template, i.e., a parent configuration template. It will be understood that there can be multiple levels of such inheritance hierarchy. The configuration template inherits the metadata pertaining to variations in the application behavior from the parent configuration template. In said example, the application behavior will be governed by the differential attribute corresponding to the parent configuration template.

In one implementation, when a multi-tenant application is accessed by one or more tenants, it is determined whether variations from a default behavior of the multi-tenant application are available. For example, it may be determined whether a reference attribute has been encountered in application code. As previously mentioned, the reference attribute represents the default attribute behavior as well as the variations available. Further, if it is determined that the reference attribute is encountered, it is determined if a configuration template is defined for the tenant. If the configuration template is not defined for the tenant, differential attribute, i.e., the application behavior corresponding to the tenant is identified, based on the reference attribute and the tenant accessing the multi-tenant application. Further, if it is determined that the configuration template is defined for the tenant then the application behavior corresponding to the tenant is identified based on the configuration template, the reference attribute, and the tenant accessing the multi-tenant application. The differential attribute includes an attribute value indicating an application behavior to be exhibited by the multi-tenant application for the encountered reference attribute and the tenant that encountered the reference attribute.

In one example, for a given reference attribute, a differential attribute may be uniquely specified for the tenant. In said example, the differential attribute may be identified based on the reference attribute and the tenant accessing the multi-tenant application.

In another example, a configuration template may be identified for the tenant. Further, the identified configuration template may be searched to ascertain the differential attribute based on the reference attribute.

In yet another example, subsequent to identification of a configuration template, one or more parent configuration templates associated with the configuration template may be determined. Subsequently, the parent configuration templates may be searched to ascertain the differential attribute based on the reference attribute.

In one implementation, a configuration template may have only one differential attribute mapped to a reference attribute. In another implementation, multiple differential attributes may be mapped to a reference attribute within the same configuration template. In said implementation, a locale attribute corresponding to a user associated with a tenant, or a locale attribute preferred by the tenant is ascertained from corresponding metadata. Subsequently, the configuration template may be searched to ascertain the differential attribute based on the ascertained locale attribute as well as the reference attribute.

Upon ascertaining the differential attribute, for that tenant, the multi-tenant application behaves according to the metadata pertaining to the differential attribute. Further, in one implementation, in case no differential attribute is mapped to the reference attribute for a tenant, the multi-tenant application behaves according to the default behavior governed by the base template. In other words, if no differential attribute is ascertained, the default value of the reference attribute is taken as the differential attribute.

Metadata pertaining to the multi-tenant application include, for example, tenant-attribute associations, tenant-configuration template associations, attribute-configuration template associations, attribute-locale-configuration template associations, configuration template inheritance, and application attribute definitions. The metadata may be stored in a persistent storage or, at run-time, in a cache memory. Owing to the provision of configuration templates, which may be common for a group of tenants and which may be inherited from other configuration templates, duplication of the metadata pertaining to variations requested by multiple tenants is avoided, which not only is efficient in terms of storage space, but also in terms of application performance, metadata management and application scalability. Thus, the described systems and methods can cater to a larger number of tenants without incurring additional expenditure on management, storage, etc.

While aspects of described systems and methods for providing various application behaviors of multi-tenant applications can be implemented in any number of different computing systems, environments, and/or configurations, the embodiments are described in the context of the following exemplary system(s).

Exemplary Systems

Figure 1:
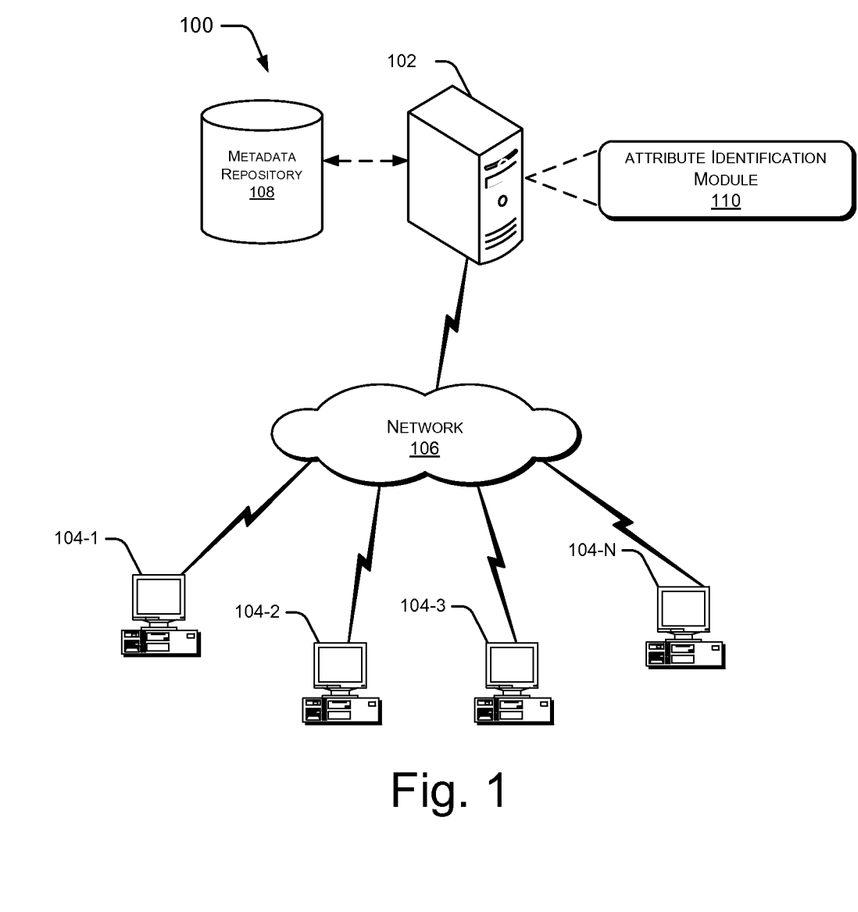
FIG. 1 illustrates a network environment implementing a multi-tenant system, in accordance with an embodiment of the present subject matter.

FIG. 1 illustrates a network environment 100 implementing a multi-tenant system 102, according to an embodiment of the present subject matter. The network environment 100 includes the multi-tenant system 102, multiple tenant devices 104-1, 104-2, 104-3, . . . , 104-N coupled to the multi-tenant system 102 via a network 106. For the purpose of explanation, the tenant devices 104-1, 104-2, 104-3, . . . , 104-N, are collectively referred to as the tenant device(s) 104. It will be understood that in case an organization is a tenant for the multi-tenant system 102, tenant devices 104 can be user devices of users of the organization as well. Further, the tenant devices 104 may be interchangeably referred to as the tenant(s) 104.

The network 106 may be a wireless network, wired network or a combination thereof. The network 106 can be implemented as one of the different types of networks, such as intranet, local area network (LAN), wide area network (WAN), the Internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other.

The multi-tenant system 102 and the tenants 104 can be implemented as any of a variety of conventional computing devices, including, for example, servers, a desktop PC, a notebook or a portable computer, a workstation, a mainframe computer, a mobile computing device, an entertainment device, and an Internet appliance. Further, the multi-tenant system 102 may be coupled to one or more application servers (not shown in the figures) for hosting multi-tenant applications and for providing and receiving data pertaining to the multi-tenant applications to and from the tenants 104. The application servers, which may be distributed locally or across one or more geographic locations, can be physically or logically connected to the multi-tenant system 102. However, it will be understood that the multi-tenant system 102 can also be implemented as an application server.

In one embodiment, the multi-tenant system 102 is associated with a metadata repository 108, which stores metadata pertaining to the multi-tenant applications and the tenants 104. The metadata repository may include metadata pertaining to tenants, to a base template, one or more configuration templates, inheritance of configuration templates, reference attributes, and differential attributes associated with the multi-tenant application. Although the metadata repository 108 is illustrated external to the multi-tenant system 102, it will be understood that the metadata repository 108 may be internal to the multi-tenant system 102 as well. The metadata repository 108 includes, for example, metadata indicative of preferences of the tenants 104 accessing the multi-tenant applications. Further, the metadata can be stored in Extensible Markup Language (XML) files or in database in the form of various data structures, such as, tables. The metadata repository 108 can be implemented as, for example, a single repository, a distributed repository or a collection of distributed repositories.

The tenants 104 may access one or more multi-tenant applications. The multi-tenant application is designed and developed to include a plurality of application attributes associated with it. The application attributes govern behavior of the multi-tenant application. The application attributes include, for example, a multi-tenant application's user interface, its processing steps, its business rules, its workflow, its access controls, its data structures, its reports, and its integrations with other applications.

The multi-tenant system 102 includes, amongst other things, an attribute identification module 110. The attribute identification module 110 can also be provided in an external storage media, which may interface with the multi-tenant system 102. In one implementation, the attribute identification module 110 determines whether a reference attribute of a multi-tenant application is encountered in application code. The reference attribute is an application attribute of the multi-tenant application for which there can be variations from the default behavior of the multi-tenant application for various tenants.

When the multi-tenant system 102 determines that the reference attribute is not encountered in the application code for the tenant 104, the multi-tenant application follows a default behavior, which can be defined in a base template associated with the multi-tenant application. The base template governs the default behavior of the multi-tenant application and holds metadata pertaining to the default behavior of the multi-tenant application. The default behavior represents the most common application behavior that the tenants 104 are likely to choose. However, if it is determined that the reference attribute is encountered in the application code, the attribute identification module 110 is configured to identify the reference attribute encountered. In one implementation, the multi-tenant application may include one or more reference attributes, each being uniquely identified by a reference attribute identification (ID).

Each reference attribute may be associated with a plurality of differential attributes. Further, each differential attribute indicates a behavior of the multi-tenant application with respect to the reference attribute. The differential attributes can include attribute values indicating variation in the default behavior with respect to the reference attribute, or default attribute values indicating no variation in the default behavior of the multi-tenant application with respect to the reference attribute. Upon identifying the reference attribute, the attribute identification module 110 ascertains if a configuration template is defined for the tenant 104. Based on the ascertainment, an application behavior corresponding to a tenant 104 that encountered the reference attribute is identified. It will be understood that the application behavior may identified by way of differential attributes. Additionally, each of the tenants 104 may be identified by way of a corresponding tenant ID.

In one implementation, the multi-tenant application may have one or more configuration templates associated with it. Further, a configuration template may contain one or more differential attributes, which specifies application behavior requested by one or more tenants 104. In an example, a configuration template may be common for a group of tenants. In another example, a configuration template may be defined for a single tenant only. Further, for a given reference attribute and a tenant 104 the attribute identification module 110 may ascertain the corresponding differential attribute based on a tenant's configuration template. Moreover, a configuration template may be inherited from one or more other configuration templates. The configuration templates from which a configuration template inherits can be referred to as parent configuration templates. In case the configuration template inherits from one or more parent configuration templates, for a given reference attribute and a tenant, say the tenant 104, the attribute identification module 110 may ascertain corresponding differential attribute based on the parent configuration templates.

The application attributes, the reference attributes, the differential attributes, the base template, and the configuration templates can be determined manually or by the multi-tenant system 102, as explained in detail with reference to description of FIG. 2a. As mentioned previously, the identified differential attribute can have differential value or a default attribute value. The attribute identification module 110 may provide the identified differential attribute to the multi-tenant application such that the application behavior is based on an attribute value associated with the differential attribute.

Figure 2A:
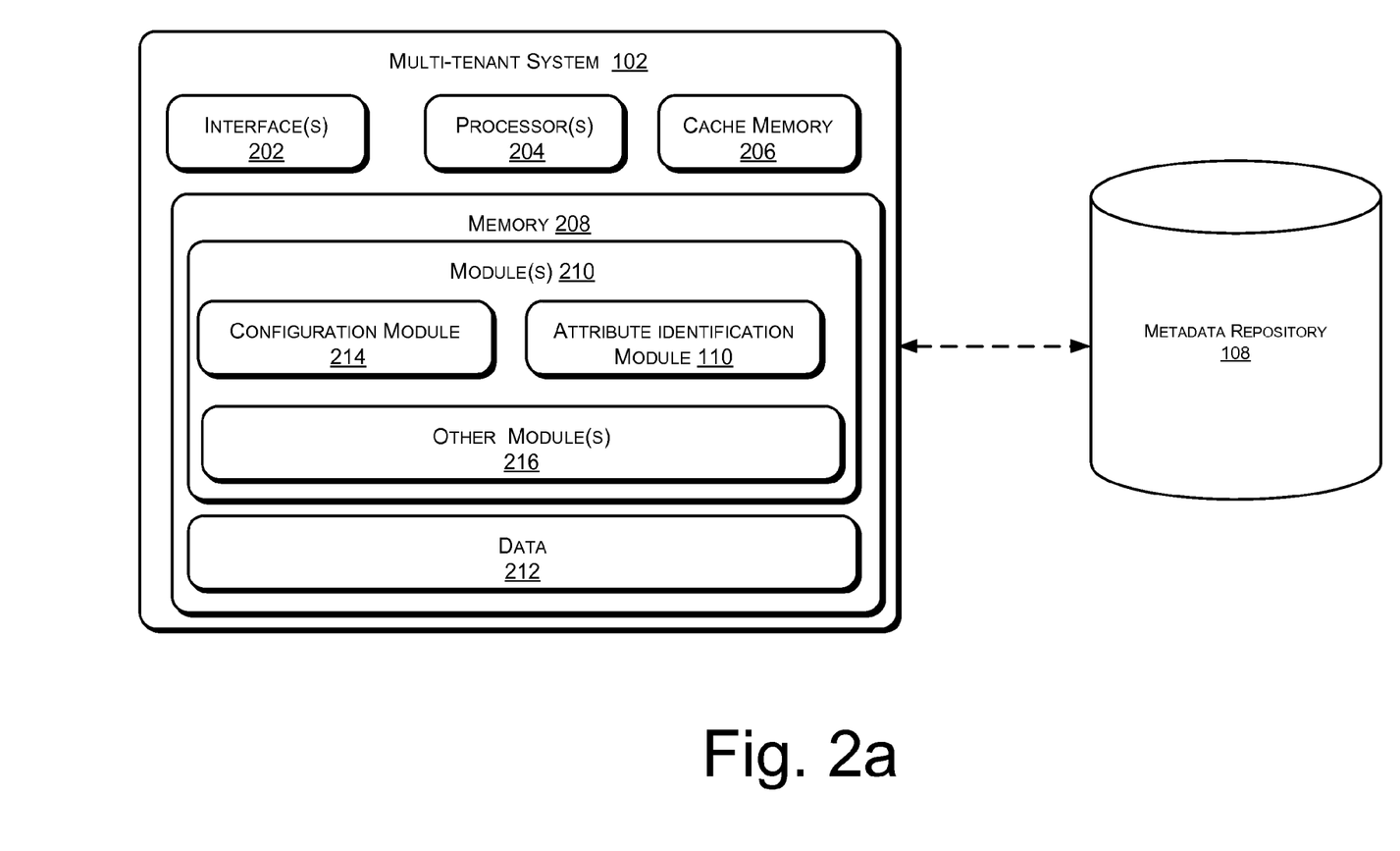
FIG. 2a illustrates components of the multi-tenant system, in accordance with an implementation of the present subject matter.
Figure 2B:
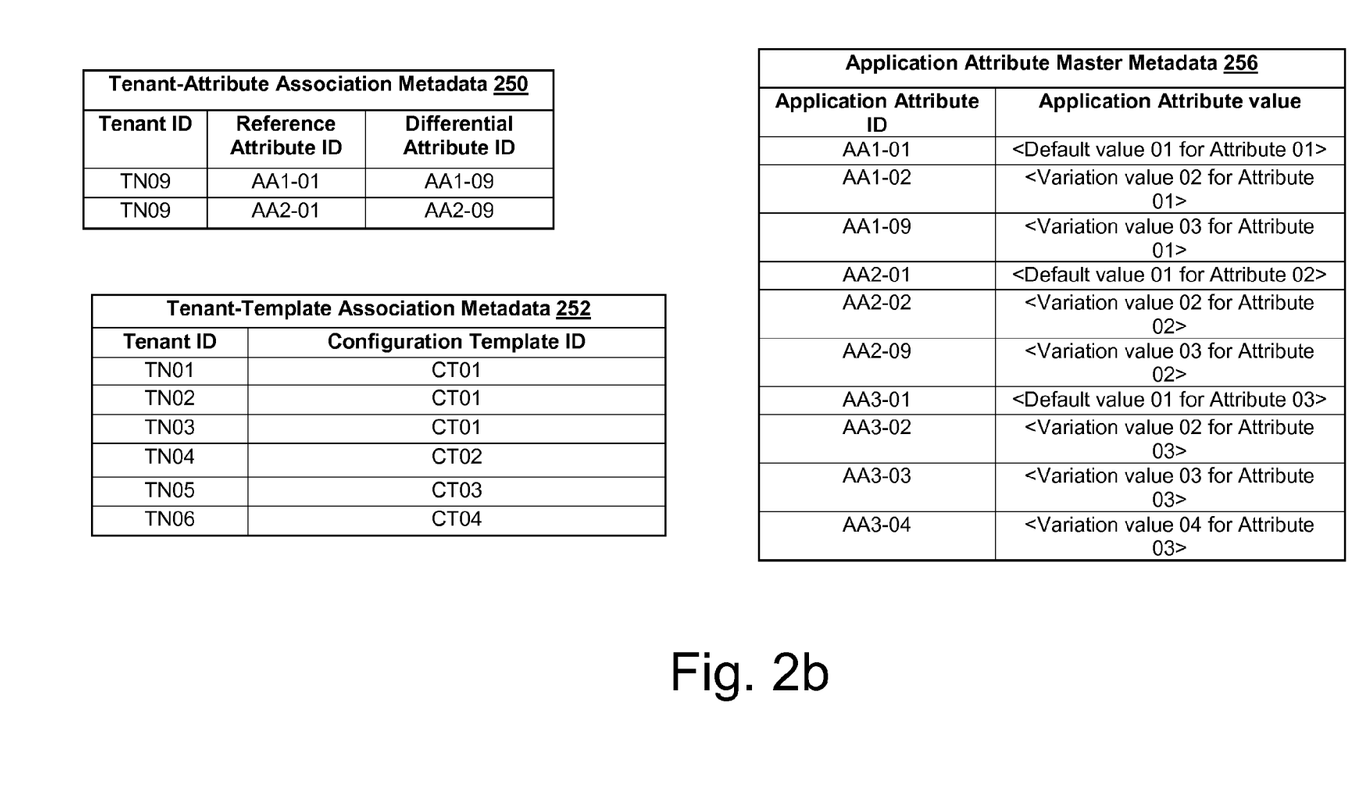
FIGS. 2b and 2c illustrates metadata pertaining to a multi-tenant application hosted on the multi-tenant system, in accordance with an implementation of the present subject matter.
Figure 2C:
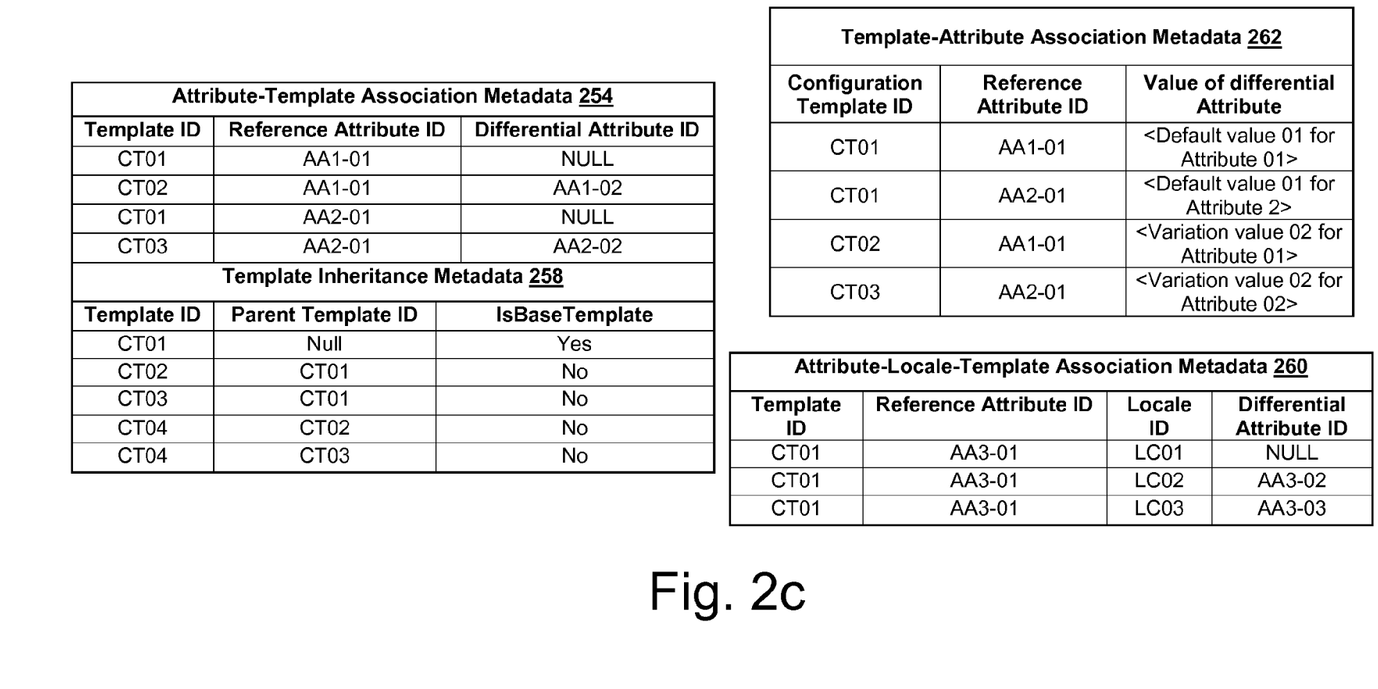

FIG. 2a illustrates exemplary components of the multi-tenant system 102 and FIGS. 2b and 2c illustrate metadata pertaining to a multi-tenant application hosted on the multi-tenant system 102 according to an embodiment of the present subject matter. The multi-tenant system 102 includes interface(s) 202, one or more processor(s) 204, and memory, such as a cache memory 206 and a memory 208, coupled to the processor(s) 204.

The interfaces 202 may include a variety of software and hardware interfaces, for example, interfaces for peripheral device(s), such as a keyboard, a mouse, an external memory, and a printer. Further, the interfaces 202 may enable the multi-tenant system 102 to communicate with other computing systems, such as web servers and external databases. The interfaces 202 can facilitate multiple communications within a wide variety of networks and protocol types, including wired networks, for example local area network (LAN), cable, etc., and wireless networks such as Wireless LAN (WLAN), cellular, or satellite. For the purpose, the interfaces 202 may include one or more ports for connecting a number of computing systems to each other or to another server computer. In one implementation, the multi-tenant system 102 communicates with the metadata repository 108 and the application servers via the interfaces 202.

The processor 204 can be a single processing unit or a number of units, all of which could include multiple computing units. The processor 204 may be implemented as one or more microprocessors, microcomputers, microcontrollers, digital signal processors, central processing units, state machines, logic circuitries, and/or any devices that manipulate signals based on operational instructions. Among other capabilities, the processor 204 is configured to fetch and execute computer-readable instructions and data stored in the memory 208.

In one implementation, the cache memory 206, also referred to as the cache 206, acts like a temporary storage medium where frequently and recently accessed data can be stored for rapid access. Once data is stored in the cache 206, it can be used in the future by accessing a cached copy of the data rather than re-fetching or re-computing the data from a persistent storage, such as, the metadata repository 108, thereby reducing execution time. Although, the cache 206, as illustrated, is placed separate from the processor(s) 204, the cache 206 may be placed along with the processor(s) 204 on the same integrated circuit.

The memory 208 may include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes. Although, the memory 208 and cache 206 have been illustrated as separate components; it will understood that the memory 208 may be integrated with the cache 206. The memory 208 includes module(s) 210 and data 212. The modules 210, amongst other things, include routines, programs, objects, components, data structures, etc., which perform particular tasks or implement particular abstract data types. The data 212 serves, amongst other things, as a repository for storing data processed, received and generated by one or more of the modules 210. The modules 210 further include, for example, a configuration module 214, attribute identification module 110, and other module(s) 216. The other modules 216 may include programs that supplement applications on the multi-tenant system 102, for example, programs in the operating system. The data 212 includes data generated as a result of the execution of one or more modules 210.

The multi-tenant applications accessed by the tenants 104 may be hosted by the multi-tenant system 102 or they may be stored externally and interfaced to the multi-tenant system 102. Further, the data generated by the multi-tenant applications may be stored in the multi-tenant system 102 or any external database. In one implementation, the multi-tenant applications associated with the multi-tenant system 102, hereinafter referred to as system 102, are configured to cater to various application behaviors preferred by the tenants 104. In one example, the multi-tenant application may be configured manually. In another example, the multi-tenant applications may be configured by the configuration module 214.

In order to configure a multi-tenant application, a knowledge base (not shown in the figures) including metadata pertaining to application behavior preferred by the tenants 104 accessing the multi-tenant application is created. The metadata repository 108 may include the knowledge base. The knowledge base may include details pertaining to a typical application behavior of a multi-tenant application. Further, the application behavior preferred by various tenants can be determined by way of surveys, interviews, feedback forums, group sessions, etc., and the gathered information may be stored in the knowledge database. It will be understood that the typical application behavior can also be identified based on the application behaviors preferred by various tenants 104.

Based on the information, the configuration module 214 may identify application attributes associated with the multi-tenant application. The configuration module 214 may further determine a default behavior of the multi-tenant application, based on factors such as the behavior most preferred by the tenants 104 accessing the multi-tenant application, or as another example, the behavior that would be acceptable to all tenants or as yet another example, the behavior that makes the most efficient use of resources. Further, based on the default behavior, default application attributes are identified. The default attribute value is an attribute value of an application attribute indicating that the default behavior of the multi-tenant application is to be followed. Further, the configuration module 214 may be configured to identify which of the application attributes can have different values for different tenants. Such application attributes are identified as the reference attributes. Each of the reference attributes may be identified by a unique reference attribute ID, which may be stored in the metadata repository 108.

The reference attributes are externalized from an application's source code such that the reference attributes may be changed any time and any change to the reference attribute does not entail a recompilation or redeployment of the multi-tenant application. In one implementation, metadata pertaining to all the application attributes are provided in the base template for the multi-tenant application. The base template includes reference attributes such that the application behavior changes with a change in the value of the reference attribute. The base template holds metadata pertaining to the default behavior, which is common to all the tenants 104 and accordingly a single copy of this metadata may be stored in a persistent storage, for example, in metadata repository 108 or, at run-time, in the cache 206 or cache memory of an application server. The metadata repository 108 may include, one or more of tenant-attribute association metadata 250, tenant-template association metadata 252, attribute-template association metadata 254, application attribute master metadata 256, template inheritance metadata 258, attribute-locale-template association metadata 260, and template-attribute master metadata 262.

Upon identification of the reference attributes, in one implementation, the application behaviors preferred by various tenants 104 may be stored as the differential attributes. Each differential attribute, i.e., each implementation of the application behavior for a reference attribute, may have a unique differential attribute ID associated with it. Further, it may be determined whether a variation is only preferred by a tenant or a group of tenants. In case the variation is preferred by a tenant, say, the tenant 104-1, then a differential attribute may be uniquely defined for the tenant 104-1 and corresponding metadata may be stored in the metadata repository 108. However, if same variation to the default behavior with respect to a given reference attribute, i.e., the same differential attribute is preferred by more than one tenant, a configuration template holding metadata pertaining to an application behavior of the multi-tenant application may be created. In such a case the metadata regarding this differential attribute contained in the configuration template may be stored only once instead of creating a copy of metadata for each tenant in the group.

In another implementation, a configuration template may be created such that it inherits metadata from one or more other configuration templates, referred to as the parent configuration templates. Further, it will be understood that the configuration template, which inherits from one or more parent configuration templates may be uniquely defined for a tenant as well. Since, a configuration template inherits from one or more parent configuration templates; multiple copies of the same metadata are not created.

In one implementation, a configuration template may be extracted from a specific application behavior configured for one tenant. In an example, such a tenant may be a pioneer in the industry and may have refined an application behavior of the multi-tenant application. This application behavior can be made available to other tenants via a new configuration template. This new configuration template can be made available to other similar tenants and hence a new tenant group can be formed. Similarly a new hybrid template can be formed by extracting specific differential attributes from multiple individual configuration templates.

Further the creation of base templates, configuration templates, and parent configuration templates may be done at a configuration stage of the multi-tenant system. As mentioned previously, metadata repository 108 may be configured to include base templates, configuration templates, parent configuration templates; and metadata pertaining to the reference attributes and differential attributes.

In operation, when a multi-tenant application is accessed by the tenants 104, the metadata pertaining to the multi-tenant application is brought in the cache 206 of the system 102 for faster access. When the multi-tenant application is accessed, the attribute identification module 110 determines if a reference attribute is encountered in the application code by a tenant, say, the tenant 104-1. As mentioned previously, each tenant and reference attribute may be identified by the unique tenant ID and the reference attribute ID respectively. Thus, when the multi-tenant application is accessed by the tenant 104-1, the attribute identification module 110 by way of the reference attribute ID may determine if an application attribute, which is encountered is a reference attribute or not.

When the attribute identification module 110 determines that an application attribute that is encountered is not a reference attribute, a default value of an application attribute, which is encountered, may be provided to the multi-tenant application. Accordingly, the multi-tenant application exhibits the default behavior with respect to the encountered application attribute for the tenant 104-1. However, if it is determined that the reference attribute is encountered, the attribute identification module 110 identifies an application behavior corresponding to the tenant 104-1, based at least on the reference attribute and the tenant 104-1. For example, in a multi-tenant application for computing taxes, tenants residing in various jurisdictions will have specific rules for computing taxes although the basic rules of the tax application would be the same. In such a case, the reference attribute can be business rules. Thus, the reference attribute would follow different tax computation rules for tenants of different jurisdictions.

In an implementation, the attribute identification module 110 determines if a configuration template is defined for a tenant, say, tenant 104-1. In an example, the configuration template corresponding to the tenant 104-1 can be the base template. The configuration template may include metadata pertaining to one or more differential attributes. The attribute values defined by the configuration template take precedence over the attribute values for the same application attributes defined by the base template. Further, the configuration template may be common to a group of tenants preferring a similar application behavior or may be defined for only a single tenant. For example, tenants belonging to same industry vertical, geographic location, or having similar locale conventions may share a common configuration template. The configuration templates may be uniquely identified by way of configuration template ID. The attribute identification module 110 may identify the configuration template corresponding to the tenant 104-1 using tenant-template association metadata 252. For example, consider that the tenant 104-1 has tenant ID TN04, then a corresponding entry for the configuration template ID may be checked in the tenant-template association metadata 252 and CT02 may be identified as the configuration template.

Further, if it is determined that the key does not exists in the tenant-template association metadata 252, it is determined if the differential attribute is uniquely defined for the tenant 104-1. For example, if a specific application behavior is preferred by a tenant, say, the tenant 104-1 and is not preferred by other tenants, then a differential attribute indicating the specific application behavior may be defined for the multi-tenant application. In said implementation, the attribute identification module 110 may look up the metadata pertaining to the multi-tenant application, for instance, in the tenant-attribute association metadata 250, for determining such individual-specific differential attributes. For the purpose, the attribute identification module 110 may form a key including a tenant ID corresponding to the tenant 104-1 and the reference attribute ID corresponding to the encountered reference attribute. Further, if the key exists in the tenant-attribute association metadata 250, a corresponding differential attribute is identified which can be by way of a differential attribute ID. Further, an attribute value of the differential attribute may be determined by using application attribute master metadata 256, which includes attribute values of all the application attributes, i.e., default attribute values and differential attribute values.

For example, consider that the tenant 104-1 has tenant ID TN09 and it encounters reference attribute AA1-01. In said example, the attribute identification module 110 may form a key, TN09+AA1-01, and look up a corresponding entry for differential attribute in tenant-attribute association metadata 250. Using TN09+AA1-01 as the key, it is determined AA1-09 is the corresponding differential ID. Subsequently, AA1-09 is used as a key in the application attribute master metadata 256 and the corresponding attribute value is retrieved, which indicates the application behavior preferred by the tenant 104-1.

However, if the attribute identification module 110 determines that a differential attribute is not uniquely defined for the tenant 104-1 and a configuration template is also not defined, then a default value of the reference attribute is provided to the multi-tenant application. It will be understood that the attribute identification module 110 may first determine whether a differential attribute is uniquely defined for a tenant and based on the determination, the attribute identification module 110 may ascertain if a configuration template is defined for the tenant 104-1.

In one implementation, if it is determined that the configuration template is defined for the tenant 104-1, upon identifying the configuration template, the attribute identification module 110 may determine if the differential attribute for the encountered reference attribute is defined by the configuration template. For example, the attribute identification module 110 may look up in the attribute-template association metadata 254, with configuration template ID and the reference attribute ID as the key. If the key exists it may be determined that the differential attribute for the encountered reference attribute is defined by the configuration template. Subsequently, attribute value of the corresponding differential attribute is ascertained and provided to the multi-tenant application. In an example, consider the configuration template ID, say, CT02 along with the reference attribute ID, say, AA1-01. Now, CT02+AA1-01 is used as the key in the attribute-template association metadata 254 and AA1-02 can be identified as the differential attribute.

However, if the key does not exist in the attribute-template association metadata 254, the attribute identification module 110 may look up the template inheritance metadata 258 and check for an entry for parent configuration template corresponding to the identified configuration template. Thus, the attribute identification module 110 determines if the identified configuration template is associated with one or more parent configuration templates. In one implementation, the configuration template may not have attribute values for all application attributes, in such a case, values for such application attributes may be inherited from the parent configuration templates. For example, the attribute identification module 110 may identify all the parent configuration templates associated with the configuration template. In other words, the parent configuration templates are determined until the base template is identified. The base template can be identified using the template inheritance metadata 258 based on the "IsBaseTemplate" flag.

For example, consider that the identified configuration template has configuration template ID as CT02, and the encountered reference attribute is AA2-01; then CT02+AA2-01 is used as a key to look up for a corresponding differential attribute in the attribute-template association metadata 254. Since, the key CT02+AA2-01 does not exist, therefore to ascertain if the configuration template CT02 inherits from any parent configuration template, CT02 is used as a key in the template inheritance metadata 258 and CT01 is determined as its parent configuration template. Subsequently, for the reference attribute, say, AA2-01 and the parent configuration template CT01, a corresponding differential attribute, NULL, is ascertained from attribute-template association metadata 254. The differential attribute NULL indicates that a default value of the reference attribute is to be taken. Thus, the attribute identification module 110 provides a default value of the reference attribute to the application, indicating the default behavior of the multi-tenant application is preferred by the tenant 104-1.

Further, it will be understood there can be multi-level inheritance hierarchy. Furthermore, the attribute values, which are not specified in a configuration template and the corresponding parent configuration templates, may take the default attribute value as defined in the base template. Referring to template inheritance metadata 258, value of a reference attribute defined in CT04 would take precedence over the value of the same reference attribute in CT02. Similarly, value of a reference attribute defined in CT04 would take precedence over the value of the same reference attribute in CT03. Still further, the values of the application attributes defined in the CT02 take precedence over the attribute values of the same application attribute in CT01 and only attribute values missing in CT04, CT02, and CT03 will take default attribute values as defined by CT01, i.e., the base template.

In an example, consider that the identified configuration template has configuration template ID as CT04, then CT04, is used as a key in the template inheritance metadata 258. Based on the configuration template ID CT04, CT02 and CT03 are identified as the parent configuration templates. Now considering reference attribute ID as AA 1-01, a key may be formed with each of the configuration template ID, CT02 and CT03, which may be looked up in attribute-template association metadata 254. By looking up in the attribute-template association metadata 254, it may be ascertained that key CT02+AA1-01 exists, while CT03+AA1-01 does not, thereby ensuring that there is no overlap of the application attributes and inconsistent application behavior is averted. Accordingly, a differential attribute corresponding to CT02+AA 1-01, which is AA1-02, is identified. The attribute value for AA1-02 may be determined from the application attribute master metadata 256.

Further, in one implementation, in case it is determined that no individual tenant specific differential attribute, no configuration template, no parent configuration template is defined for a tenant 104, then in such a case, the attribute identification module 110 may provide a default attribute value of the reference attribute to the multi-tenant application. In one implementation, the attribute identification module 110 accesses the template inheritance metadata 258 to identify the base template based on the "IsBaseTemplate" flag. Further, based on the base template and the encountered reference attribute, corresponding differential attribute is identified using the attribute-template association metadata 254. Furthermore, a value of the differential attribute is ascertained using the application attribute master metadata 256.

Additionally or alternately, a reference attribute of the multi-tenant application can be locale sensitive. For example, a reference attribute may have variations for various users in the same tenant 104. Such user specific variations may be identified by way of locale attributes, uniquely identified by locale attribute IDs. When a reference attribute is encountered it may be determined that the encountered reference attribute is locale sensitive and accordingly a locale attribute of the tenant 104 is identified. In said implementation, based on the reference attribute and the locale attribute, a differential attribute for the tenant 104 or a user of the tenant 104 is identified. As previously mentioned, the differential attribute may be uniquely defined or may be identified by way of configuration template. Further, in case no configuration template is identified or it is determined that the differential attribute is not uniquely defined for a tenant, a default value of the reference attribute is provided to the multi-tenant application.

For example, upon determining a configuration template for the tenant 104 and determining its inheritance, a differential attribute can be determined using attribute-locale-template association metadata 260. The attribute identification module 110 may use configuration template ID, reference attribute ID, and locale ID as the key in the attribute-locale-template association metadata 260. Consider that the configuration template for a tenant is CT01 and the encountered reference attribute is AA3-01, the differential attribute for the end-user associated with the tenant running the multi-tenant application needs to be identified. The attribute identification module 110 determines that reference attribute AA3-01 is locale sensitive based on locale attribute metadata (not shown in the figures) and an entry for CT01+AA3-01 does not exist in attribute-template association metadata 254. The user's locale is then identified from the locale attribute metadata. Consider that the user's locale ID is identified as LC03. The attribute identification module 110 then looks up the attribute-locale-template association metadata 260 using CT01+AA3-01+LC03 as the key to identify AA3-03 as the differential attribute ID. The attribute value for AA3-03 may be determined from the application attribute master metadata 256. It will be understood that in absence of a user's locale information, a tenant's preferred locale attribute, stored in the locale attribute metadata, can be substituted for a user's locale in the said example.

In another implementation, upon identifying the configuration template associated with the tenant 104, instead of looking up attribute-template association metadata 254, application attribute master metadata 256, attribute-locale-template association metadata 260, the attribute identification module 110 looks up the template-attribute master metadata 262 to identify an application behavior preferred by the tenant, i.e., to identify the differential attribute. The template-attribute association metadata 262 includes details pertaining to application behaviors of the multi-tenant application with reference to the configuration templates and reference attributes. In said implementation, a configuration template ID and a reference attribute ID of an encountered reference, is used as a key in the template-attribute association metadata 262 to identify the application behavior preferred by the tenant 104. For example, if the CT02 is identified as the configuration template and AA1-01 is the encountered reference attribute, then <Variation value 02 for Attribute 01> is identified as the differential attribute value indicating that variation 2 for the encountered reference attribute is preferred by the tenant 104. Further, similarly, configuration template IDs of the parent configuration templates can also be used. Likewise, in case of locale sensitive reference attributes, template-attribute association metadata 262 may include a field for locale attribute ID and accordingly the configuration template ID, reference attribute ID, and locale attribute ID can be used as a key.

Further, it will be appreciated that the examples of metadata pertaining to the multi-tenant application discussed above are merely for illustration and not as limitations. The metadata layout and configuration may vary for different implementations.

Thus, owing to the provision of grouping of tenants, which share a common configuration template and inheritance of metadata pertaining to reference attributes, duplication of metadata is avoided. Consequently, the system 102 is storage efficient, easy to maintain and caters to large number of tenants without incurring additional expenditure.

Figure 3:
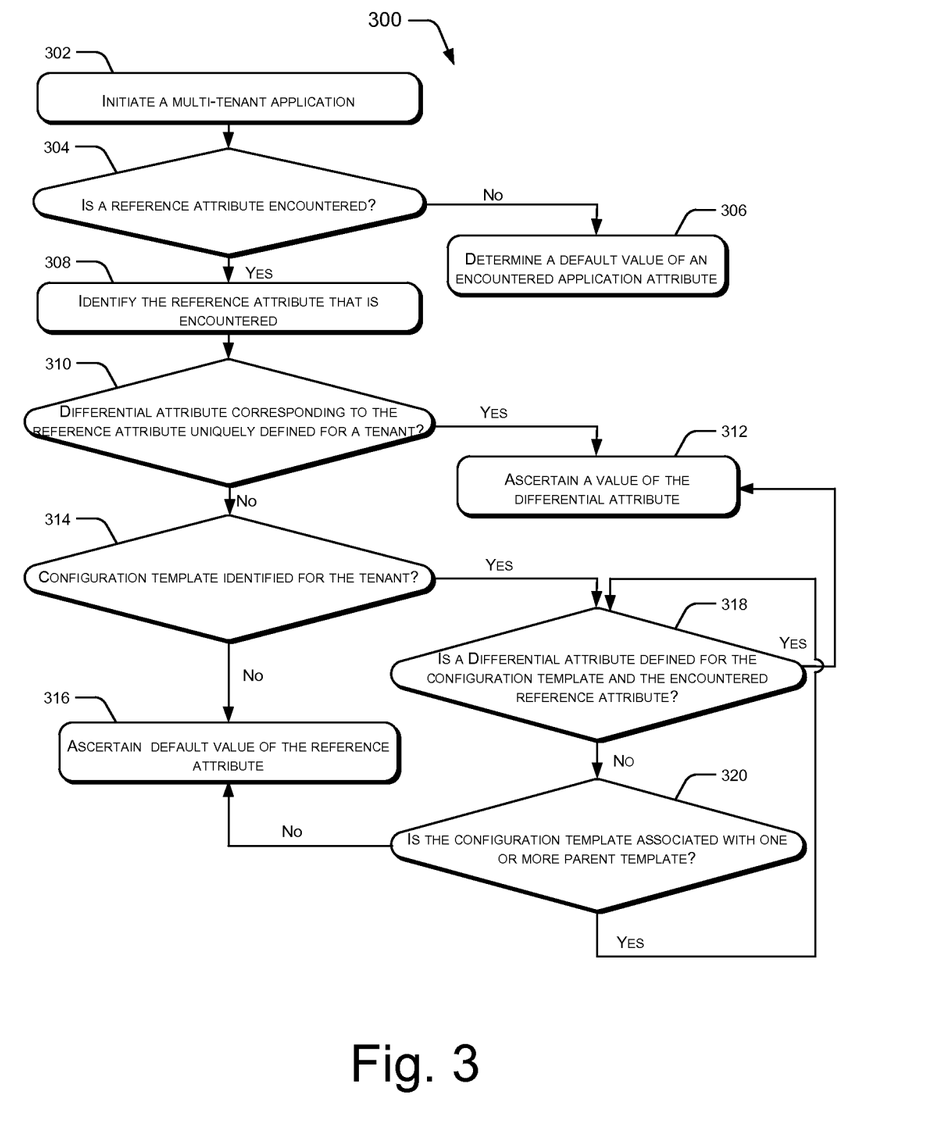
FIG. 3 illustrates an exemplary method to determine an application behavior of a multi-tenant application based on preferences of a tenant, in accordance with an implementation of the present subject matter.

FIG. 3 illustrates an exemplary method 300 for ascertaining and providing a behavior of a multi-tenant application based on preferences of tenants, in accordance with an implementation of the present subject matter.

The exemplary method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof. The method is explained with reference to a multi-tenant application, however, it will be understood that the method 300 can be implemented for a plurality of multi-tenant applications. Further, the method 300 may be executed for each reference attribute in the multi-tenant application.

At block 302, a multi-tenant application is initiated. For example, a multi-tenant application hosted by the multi-tenant system 102 or an application server, is initiated by the tenant 104. In one implementation, when the multi-tenant application is initiated the corresponding metadata from the metadata repository 108 is brought into the cache 206.

At block 304, it is determined whether a reference attribute of the multi-tenant application is encountered. In one implementation, the attribute identification module 110 determines if the reference attribute is encountered. If it is determined that the reference attribute is not encountered, the block 304 branches to (NO branch) block 306. For example, in case an application attribute for which no variations are available is encountered, the block 304 branches to block 306.

At block 306, a default value of the application attribute is determined. The default value may be included in a base template of the multi-tenant application. Thus, in such a case, the multi-tenant application follows a default behavior governed by the base template.

Referring back to block 304, if it is determined that a reference attribute is encountered, the block 304 branches to (YES branch) block 308. For example, in case it is determined that for the encountered application attribute multiple attribute values are available, block 304 branches to block 308.

At block 308, the reference attribute that is encountered is identified. For example, a unique ID may be associated with each reference attribute of the multi-tenant application. In one implementation, the attribute identification module 110 identifies a reference attribute ID corresponding to the encountered reference attribute. Additionally, the attribute identification module 110 also identifies a tenant ID corresponding to a tenant that encountered the reference attribute.

At block 310, it is determined if a differential attribute corresponding to the reference attribute is uniquely defined for a tenant that encountered the reference attribute. In one implementation, the attribute identification module 110 determines if an individual specific application behavior for the reference attribute is defined for the tenant 104 by accessing the tenant-attribute association metadata 250. The attribute identification module 110 identifies the differential attribute defined for the tenant 104 based on a tenant ID and a reference attribute ID. If it is determined that the differential attribute is uniquely defined for the tenant, block 310 branches to (YES branch) block 312.

At block 312, a value of the differential attribute corresponding to the reference attribute is ascertained. In one implementation, the attribute identification module 110 looks up the attribute value in the application attribute master metadata 256 based on the identified differential attribute. For example, in case the tenant 104 prefers three levels of access control against default two levels, then the reference attribute, in this case access control, may have a differential attribute indicating that a three level access control is preferred by the tenant 104.

Referring back to block 310, if it is determined that the differential attribute is not uniquely defined for the tenant, block 310 branches to (NO branch) block 314. At block 314, it is determined if a configuration template corresponding to the tenant is identified. The configuration template may include attribute values for one or more reference attributes. The attribute values defined by the configuration template take precedence over the attribute values for the same application attributes defined by the base template. Further, the configuration template may be common to a group of tenants preferring a similar application behavior or may be defined only for a single tenant. In an example, the configuration template corresponding to the tenant can be the base template. In one implementation, the attribute identification module 110 identifies the configuration template corresponding to the tenant 104 by accessing the tenant-template association metadata 252. In case the configuration template corresponding to the tenant 104 is not identified, block 314 branches to (NO branch) block 316.

At block 316, default value of the reference attribute is ascertained. The default value of the reference attribute is provided to the multi-tenant application and accordingly the multi-tenant application exhibits the default behavior for a given reference attribute by the tenant. In one implementation, the attribute identification module 110 accesses the template inheritance metadata 258 to identify the base template based on "IsBaseTemplate" flag. Further, based on the base template and the encountered reference attribute, corresponding differential attribute is identified using the attribute-template association metadata 254. Furthermore, a value of the differential attribute is ascertained using the application attribute master metadata 256.

Referring back to block 314, if the configuration template is identified for the tenant, block 314 branches to (YES branch) block 318. At block 318 it is determined if the differential attribute is defined by the configuration template and the encountered reference attribute. In one implementation, the attribute identification module 110 determines if the differential attribute is defined by the configuration template and the encountered reference attribute. For example, the attribute identification module 110 looks up the differential attribute in the attribute-template association metadata 254 based on the reference attribute ID and the configuration template ID. In case it is determined that the differential attribute is defined, block 318 branches to (YES branch) block 312, where the attribute value of the differential attribute is ascertained. However, if it is determined that the differential attribute is not defined, block 318 branches to (NO branch) block 320.

At block 320, it is determined if the configuration template is associated with one or more parent configuration templates. In other words, it may be determined if the configuration template inherits metadata from one or more parent configuration templates. In an implementation, the attribute identification module 110 determines if the configuration template inherits metadata from any parent configuration template by accessing template inheritance metadata 258. If it is determined that the configuration template inherits from one or more parent configuration templates, block 320 branches to (YES branch) block 318. As previously mentioned, at block 318 it is determined if the differential attribute is defined by the configuration template, in this case the parent configuration template and the encountered reference attribute. However, if it is determined that the configuration template does not inherit from any parent configuration template, block 320 branches to (NO branch) block 316, where the default value of the reference attribute is ascertained.

Block 318 and block 320 may be repeated until at block 320 it is determined that the parent configuration template is the base template. For example, the attribute identification module 110 accesses the template inheritance metadata 258 to identify if the parent configuration template is the base template based on the "IsBaseTemplate" flag.

At block 312, a value of the differential attribute is ascertained based on the parent configuration template(s) and the reference attribute. In one implementation, the attribute identification module 110 ascertains the value of the differential attribute using the application attribute master metadata 256.

Further, it will be understood that the method 300 may be repeated for a reference attribute, which is locale sensitive. However, in such a case the differential attribute is determined based at least on the locale attribute and the reference attribute.

Thus, when a multi-tenant application is accessed by tenants, metadata which may be common for a group or all the tenants is not duplicated for each tenant, thereby avoiding redundancy of data. Grouping of tenant metadata together with the provision of creating multiple configuration templates that inherit metadata provides for savings in storage space, ease of management and increased scalability in case of large number of tenants.

Although embodiments for methods and systems for multi-tenancy have been described in a language specific to structural features and/or methods, it is to be understood that the invention is not necessarily limited to the specific features or methods described. Rather, the specific features and methods are disclosed as exemplary embodiments for multi-tenancy.

We claim:

1. A method comprising:
receiving a request for access to a multi-tenant application from a tenant;
configuring application attributes of the multi-tenant application for the tenant, wherein each of the application attributes determines an application behavior of the multi-tenant application, wherein the configuring comprises, for each application attribute:
determining whether an application attribute is a reference attribute of the multi-tenant application, wherein the reference attribute corresponds to a common code of a varying application attribute that varies between tenants, the common code being external to a source code of the multi-tenant application, wherein the reference attribute is mapped to at least one differential attribute of the multi-tenant application in a metadata repository, wherein the at least one differential attribute is a variation of the application attribute over the reference attribute;
ascertaining, based on the determining, whether a configuration template is defined for the tenant, wherein the configuration template comprises the at least one differential attribute for a tenant group of which the tenant is a member; and
identifying the application behavior of the application attribute based on the ascertaining, wherein the application behavior is identified based at least on the reference attribute and the at least one differential attribute; and
providing the identified application behavior for each of the application attributes to the multi-tenant application such that the multi-tenant application exhibits the identified application behavior for the tenant.

2. The method as claimed in claim 1, further comprising:
determining at least one parent configuration template from which the configuration template is derived; and
wherein the application behavior is identified based at least in part on the at least one parent configuration template.

3. The method as claimed in claim 1, further comprising:
determining a locale attribute corresponding to the tenant; and
wherein the application behavior is identified based at least on the locale attribute.

4. The method as claimed in claim 1 further comprising determining a default value of the application attribute, when the reference attribute is not encountered.

5. The method as claimed in claim 1, wherein the reference attribute is at least one of a user interface, a processing step, a business rule, a workflow, an access control, an application data structure, a report, or an integration with other multi-tenant applications.

6. The method as claimed in claim 1, wherein the identified application behavior indicates at least one of default behavior or a variation from the default behavior.

7. The method as claimed in claim 1, wherein the configuration template is associated with the tenant group.

8. A multi-tenant system comprising:
a processor; and
a memory coupled to the processor, the memory comprising an attribute identification module configured to,
determine whether a reference attribute of a multi-tenant application is encountered while configuring the multi-tenant application for a tenant, wherein the reference attribute corresponds to a common code of a varying application attribute that varies between tenants, the common code being external to a source code of the multi-tenant application, wherein the reference attribute is mapped to at least one differential attribute of the multi-tenant application in a metadata repository, wherein the at least one differential attribute is a variation of the application attribute over the reference attribute, and wherein the application attribute is associated with an application behavior;
ascertain whether a configuration template is defined for the tenant, when the reference attribute is encountered, wherein the configuration template comprises the at least one differential attribute for a tenant group of which the tenant is a member; and
identify the application behavior of the application attribute based at least on the reference attribute and the at least one differential attribute.

9. The multi-tenant system as claimed in claim 8, wherein the attribute identification module is further configured to identify the application behavior based in part on the configuration template and the reference attribute, when the configuration template is defined for the tenant.

10. The multi-tenant system as claimed in claim 9, wherein the attribute identification module is configured to:

determine at least one parent configuration template from which the configuration template is derived; and identify the application behavior based at least in part on the at least one parent configuration template.

11. The multi-tenant system as claimed in any of the claims 8 to 10, wherein the attribute identification module is further configured to:

determine a locale attribute corresponding to the tenant; and identify the application behavior based at least on the locale attribute.

12. The multi-tenant system as claimed in claim 10, wherein the at least one parent configuration template is a base template.

13. The multi-tenant system as claimed in claim 8, wherein the multi-tenant system is associated with the metadata repository, and wherein the metadata repository includes metadata pertaining to tenants, to a base template, one or more configuration templates, inheritance of configuration templates, reference attributes, and application attributes associated with the multi-tenant application.

14. The multi-tenant system as claimed in claim 8 further comprising, a configuration module configured to create at least one of a base template for the multi-tenant application or one or more configuration templates for the multi-tenant application.

15. The multi-tenant system as claimed in claim 8, wherein the attribute identification module is configured to provide a default attribute value for the reference attribute, when no application behavior is identified.

16. A non-transitory computer readable medium having computer executable instructions which when executed, implement a method comprising:

determining, for each application attribute of a multi-tenant application being configured for a tenant, whether an application attribute is a reference attribute of the multi-tenant application, wherein the reference attribute corresponds to a common code of a varying application attribute that varies between tenants, the common code being external to a source code of the multi-tenant application, wherein the reference attribute is mapped to at least one differential attribute of the multi-tenant application in a metadata repository, wherein the at least one differential attribute is a variation of the application attribute over the reference attribute, and wherein the application attribute is associated with an application behavior of the multi-tenant application;

ascertaining, based on the determining, whether a configuration template is defined for the tenant, wherein the configuration template comprises the at least one differential attribute for a tenant group of which the tenant is a member;

identifying the application behavior of the multi-tenant application for the tenant based on the ascertaining, wherein the application behavior is identified based at least on the reference attribute and the at least one differential attribute; and providing the identified application behavior to the multi-tenant application such that the multi-tenant application exhibits the identified application behavior for the tenant.

17. The non-transitory computer readable medium as claimed in claim 16, wherein the method further comprises:

determining at least one parent configuration template from which the configuration template is derived; and wherein the application behavior is identified based at least in part on the at least one parent configuration template.

18. The non-transitory computer readable medium as claimed in claim 16, wherein the method further comprises:

determining a locale attribute corresponding to the tenant; and wherein the application behavior is identified based at least on the locale attribute.

19. The method as claimed in claim 1, wherein the at least one differential attribute includes a default value of the application attribute corresponding to the reference attribute.

20. The multi-tenant system as claimed in claim 8, wherein the at least one differential attribute includes a default value of the application attribute corresponding to the encountered reference attribute.

* * * * *